Dec. 21, 1965 R. E. CURRAN 3,224,021
COMBINATION DRILLING AND TAPPING JIG
Filed Sept. 9, 1963
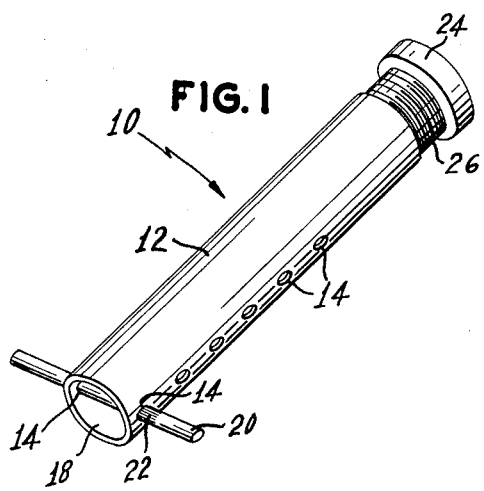
FIG. 1
FIG. 2
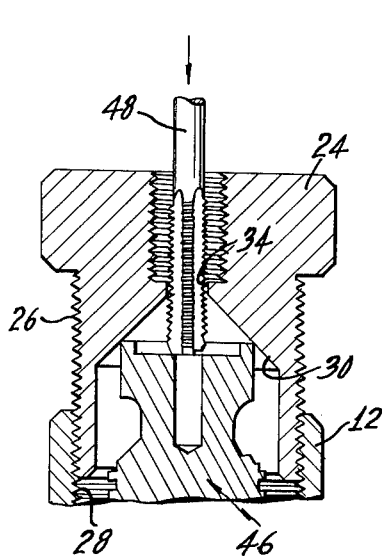
FIG. 3
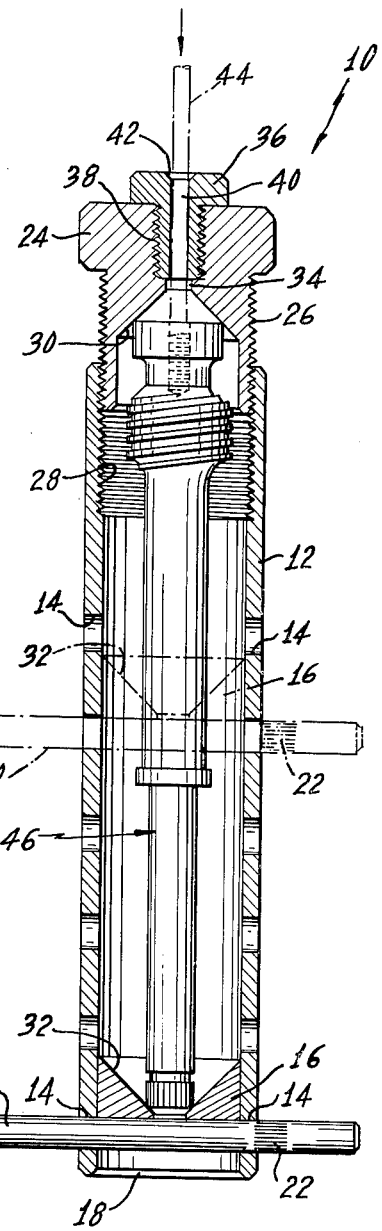
INVENTOR.
ROBERT E. CURRAN
BY
ATTORNEY

United States Patent Office 3,224,021
Patented Dec. 21, 1965

3,224,021
COMBINATION DRILLING AND TAPPING JIG
Robert E. Curran, 56 Grandview St., Huntington, N.Y.
Filed Sept. 9, 1963, Ser. No. 307,520
6 Claims. (Cl. 10—1)

This invention relates to jigs and in particular to a jig for drilling and removing a bib screw that has broken off in the end of a faucet stem and for retapping the drilled hole for the reception of another bib screw.

A conventional faucet stem is constructed with an end that normally mounts a washer. The washer is usually held in place on the end of the faucet stem by a bib screw. During use, the washer wears and from time to time, it becomes necessary to replace it. The replacement is accomplished by first removing the bib screw. Unfortunately, however, the minerals in the water chemically react with the metal of the bib screw such that the screw often becomes brittle and disintegrates or breaks off when any pressure is applied to it during an attempt at its removal from the faucet stem. Many times, this renders the faucet stem useless unless that part of the bid screw remaining in the stem can be removed and the threads retapped.

Accordingly, an object of the invention is to provide a jig that will securely hold a faucet stem while a drill is guided to drill a hole in the stem for the removal of that part of the bib screw remaining therein and for guiding a tap for the rethreading of the drilled hole.

Still another object of the invention is to provide a jig that is relatively small in size, comparatively light in weight and, therefore, sufficiently portable that it may be carried about by the plumber as another one of his conventional tools, thereby enabling the plumber to perform the redrilling and retapping of the faulty stem at the job site.

A further object of the invention is to provide a jig for the redrilling and retapping of faucet stems of different sizes and lengths of the types conventionally used and found in home and office buildings.

Other and further objects of this invention reside in the structures and arrangements hereinafter more fully described with reference to the accompanying drawing in which:

FIG. 1 is a perspective view of a jig constructed according to the teaching of the invention and shown reduced in scale, FIG. 2 is an enlarged vertical cross-section of the jig of FIG. 1 showing the parts thereof in condition for drilling a hole, and FIG. 3 is an enlarged vertical cross-section of the top of the jig shown in FIG. 1 with the parts thereof in condition for the retapping of the drilled hole.

Referring now to the drawing, the jig is generally identified by the numeral 10 and comprises a body member 12 that is elongated in length and tubular in cross section. The body member 12, being tubular, is, before assembly, open at both of its ends. Provide along the length of the body member 12 is a plurality of sets of diametrically disposed engaging means in the form of apertures 14. Each set or pair of diametrically disposed apertures 14 is separated from the other substantially equal distances along the length of the body 12. The apertures 14 define one part of an adjustment structure that enables the jig to accommodate faucet stems of different sizes and lengths.

A base member 16 is slidably movable within the hollow body member 12 to a selective position of adjustment therein for engagement with different length faucet stems. The base member 16, being slidable in the body member 12 along the length thereof, is also removable from the lower end 18 of the body member to enable the workpiece or the faucet stem to be quickly and easily inserted and removed from the jig.

The base member 16 is normally supported in its selective slidable position of adjustment within the body member 12 by a limit pin 20. The limit pin 20 forms the second part of the adjustment structure inasmuch as it is adapted to cooperate with selective ones of the plurality of sets of apertures or engaging means 14 relatively spaced lengthwise along the body member 12. The pin 20 may be of any convenient shape conforming to the shape of the engaging means 14 to slide smoothly therein. One side of the limit pin 20 is provided with a roughened or knurled peripheral portion 22. The portion 22, being roughened, is slightly larger in size than the conforming engaging means 14 within which the same is adapted to be positioned. Hence, when the pin 20 is inserted into and through a set of diametrically disposed apertures 14, the enlarged roughened or knurled portion 22 engages with the wall of the adjacent aperture and thus retains the pin in the set of apertures and prevents its accidental removal therefrom.

A top member 24 is adapted to be threadingly adjusted in the body member 12 at the top end thereof opposite that of the base member 16. For this reason, the top member 24 is threaded at 26 with threads that mate with a correspondingly threaded upper portion 28 on the interior of the body member 12. The top member 24 is thereby able to be adjusted relative to the base 16 and along the length of the body member 12 to vary the space within the interior of the body between itself and the base 16.

Both the top member 24 and the base member 16 are provided with conically shaped interior engaging guide surfaces 30 and 32 respectively. The top member 24 is provided with an opening 34 that functions as a tap guide. The opening 34 is positioned at the center of the top member 24 and, therefore, is located at the apex portion of the conical guide surface 30. The opening 34 is a through opening in that it extends fully through the top member 24 and thereby functions as a tap guide opening for guiding the movement of a tap therethrough for axial alignment and engagement with the workpiece faucet stem that is adapted to be positioned in the jig 10 in a manner to be described.

Mounted within the top member 24 is a drill guide bushing 36. The drill guide bushing is threaded along the length of a narrowed portion 38. The top member 24 is correspondingly recessed and threaded to receive and accommodate the threaded narrowed portion 38 of the drill guide bushing 36 therein. The engaging threads formed in the interior of the top member 24 and matingly cooperating with the narrowed portion 38 of the bushing 36 are so located as to position the center of the drill guide bushing in axial alignment with the tap guide opening 34. The drill guide bushing 36 is provided with a through opening 40 directed axially along its length and, by virtue of the threaded engagement between the portion 38 and the top member 24, it is positioned in axial alignment with the tap guide opening 34. The through opening 40 functions as a drill bit guide and, for this reason, its mouth is tapered at 42 to direct the drill bit 44 (shown in dash lines in FIG. 2) into the drill guide opening 40.

In actual use, when a faucet stem such as that illustrated and generally identified in FIG. 2 by the numeral 46 is required to be drilled to remove its broken bib screw and retapped, the same is inserted into the confines of the body member 12. This is facilitated by first easily removing the support limit pin 20 from its previous set of engaging means or apertures 14 and permitting the base 16 to slide and drop out from the lower end 18 of the body member 12. The faucet stem 46 is then inserted into the body member 12. Its bib screw end as shown in FIG. 2 engages with the conical surface 30 and is thereby automatically centered so that its bib screw is lined up with the drill guide opening 40. The base member 16 is then reinserted easily and, therefore, quickly into the body member 12 through the lower end 18 thereof until it rests against the opposite end of the faucet stem 46.

At that time, the limit pin 20 is again selectively inserted into the set of diametrically opposed apertures 14 positioned just beyond the location of the base member 16. The pin 20 is inserted into the selected set of apertures 14 so that its enlarged roughened portion 22 snugly engages with the wall of one of the apertures 14 thereby preventing its accidental removal, as shown in FIG. 2. When once the base 16 is so positioned within the body 12 and engages the opposite end of the faucet stem 46, its conical surfaces 32 automatically guide the engaged portion of the stem to align it so the axis of the faucet stem is aligned with the axis of the drill guide opening 40.

The faucet stem 46 is now ready to be securely locked in the jig 10 to be worked upon. This is accomplished by threading the top member 24 into the body 12 tightly against the faucet stem 46. As the stem 46 is tightened between the conical guide surfaces 30 and 32 moving relative toward each other, it becomes rigidly supported in the body 12 and locked in position relative thereto and against relative movement. The base 16 is prevented from movement because it seats against and is supported by the limit pin 20 which it engages at its lower end. The jig 10 is now ready for use.

A drill bit 44 mounted in a drill (not shown) normally carried by the plumber is now inserted into the opening 40 in the bushing 36 and is guided for precise axial alignment with the defective bib screw in the faucet stem 46. After the bib screw has been drilled out, it now becomes necessary to tap the remaining hole to provide a new thread for the accommodation of a new bib screw.

This is done by first unthreading and removing the drill guide bushing 36 from the top member 24 thereby leaving the tap guide opening 34 exposed for use as is more clearly shown in FIG. 3. A tap 48 is then inserted through its guiding opening 34 and guided for tapping engagement with and rethreading of the hole left by the drill 44. After the hole has been retapped, the tap 48 is removed and the top member 24 is unthreaded slightly from engagement with its adjacent end of the faucet stem 46. This relieves the pressure against the base member 16. Accordingly, because the pressure is relieved from the limit supporting pin 20, it can now be removed from its set of engaging means or apertures 14, thereby permitting the base member 16 to drop out of the lower end of the body 12. In turn, the faucet stem 46 may now also be dropped out from the lower end of the body 12 and is ready for reuse.

Those skilled in the art will readily recognize that the present invention will accommodate faucet stems of different sizes and lengths of the type conventionally found in the home and most office buildings. Such faucet stems are accommodated in the present invention by the selective rapid adjustment of the limit pin 20 to engage in the appropriate set or pair of engaging means or apertures 14 to selectively position the base member 16 variously along the length of the interior of the body member 12. This adjustment is accomplished quickly and thereby simply and merely requires a few turns for adjustment of the top member 24 in order to lock the faucet stem 46 between its conical guiding surface 30 and the conical guiding surface 32 of the base member 16.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a jig for performing work on variably sized faucet stems, a unitary elongated body to accommodate stems of different lengths therein, a base in said body, a top in said body, said base and top each having a conical surface facing the other and being movable relative to each other to engage and hold the opposite ends of a stem centered therebetween and from movement relative to said body, engaging means between said base and body releasable to permit said base to be moved in said body relative to said top to accommodate faucet stems of different sizes between said conical surfaces, said engaging means being engageable with said body to support said base in said body to limit it in its movement relative to said top, and said top having a through opening defined therein to enable the insertion of a tool therethrough for working cooperation with the stem.

2. In a combined drilling and tapping jig for a workpiece, a body having an open interior to receive a workpiece therein, a base member in said body having a conical surface to define the base of said open interior and against which one end of the workpiece is adapted to seat, a top member in said body having a conical surface to define the top limit of said open interior and against which the opposite end of the workpiece is adapted to seat, said top member having means engaging said body for movement relative thereto and to said base member to lock the workpiece centered between said conical surfaces and from movement relative to said body, said top member having a tap guide opening defined therein to guidingly receive a tap for tapping said workpiece, and a drill guide bushing having means releasably engageable with said top member and having a drill opening defined therein to guidingly receive a drill to drill said workpiece in alignment with said tap opening.

3. In a combined drilling and tapping jig as in claim 2, said base member being adjustable in said open interior of said body to vary the location of the base in the interior of said body, and means releasably engageable with said body to support said base member in its adjusted various locations in said body.

4. A jig for drilling and tapping faucet stems of different lengths comprising movable top and base members for adjustment relative to and from each other to secure faucet stems of different lengths therebetween, a body member along which said top and base members move, said body member supporting and guiding said top and base members during their movement to their adjusted positions, a tap guide through opening defined in the center of said top member, each of said top and base members having surfaces facing each other to engage opposite ends of a faucet stem to be secured therebetween and to center the same beneath said tap guide opening, means movable along said body member for selective engagement therewith and engageable with said base member to support said base member to limit it to a selected position of adjustment away from said top member, engaging means on said top and body members to permit movement of said top member relative to said body member and the supported base member, and a drill guide bushing includes means releasably engageable with said top member and having a drill guide through opening defined in the center thereof aligned with said tap guide opening.

5. In a jig for faucet stems of different lengths, a tubular body to accommodate a faucet stem therein through one end thereof, a top closing the other end of said body and having a through tap guide opening to guide the movement of a tap therethrough and a conical surface against which one end of the faucet stem rests and is centered thereby with respect to said tap guide opening, a base slidable in said body to a selective position of adjustment and removable from said one end of said body to enable the faucet stem to be inserted into and accommodated in said body, said base having a conical surface for engagement with the other end of the faucet stem, said body having sets of diametrically disposed apertures, each of said sets of apertures being relatively spaced along the length of said body, a pin insertable selectively in one of said sets of apertures to support said base in a selective position of adjustment along said body and to limit its sliding movement from its position of adjustment and from said one end of said body, and said top and body having engageable threads to permit adjustment of said top relative to said body to secure the faucet stem between said conical surfaces.

6. In a jig for faucet stems of different lengths as in claim 5, a drill guide bushing having a drill guide opening defined therein to guidingly receive a drill for movement therethrough, said bushing and top each having cooperatively engageable surfaces for releasable engagement of said bushing with said top, said engageable surfaces being positioned on said bushing and top to axially align said drill guide opening with said tap guide opening.

References Cited by the Examiner
UNITED STATES PATENTS 1,432,008   10/1922   Zanon _____ 269—287
2,242,792   5/1941    Panzer _____ 10—147

FOREIGN PATENTS 19,393   5/1914   Great Britain.

ANDREW R. JUHASZ, *Primary Examiner.*